June 19, 1962 J. A. REDDICK ET AL 3,039,293
METHOD OF AND APPARATUS FOR MEASURING FIBER PERMEABILITY
Filed June 11, 1959 9 Sheets-Sheet 1

INVENTORS
John A. Reddick
Earl E. Berkley
Edwin J. Jennings, Jr.

BY
ATTORNEYS

Fig. 8

United States Patent Office 3,039,293
Patented June 19, 1962

---

3,039,293
METHOD OF AND APPARATUS FOR MEASURING FIBER PERMEABILITY
John A. Reddick and Earl E. Berkley, Houston, Tex., and Edwin J. Jennings, Jr., Ponca City, Okla., assignors to Anderson, Clayton & Co., Houston, Tex., a corporation of Delaware
Filed June 11, 1959, Ser. No. 819,709
11 Claims. (Cl. 73—38)

The present invention relates to a method of and an apparatus for determining fiber fineness by measuring the permeability to gas flow, and more particularly relates to such an apparatus which is automatic in operation.

For various reasons it is sometimes necessary to know the permeability to gas flow, especially air flow, of various fibers. For example, the permeability to air flow of lint cotton is often used as an indication of its fineness, which is an important factor in the buying and selling of cotton, and the present invention is especially adapted to determining the permeability of cotton although it may be used to determine the permeability to gas flow of various other fibers.

In use today cotton fiber fineness, actually cotton permeability, is measured by a standard test procedure called "micronairing." This method consists of carefully weighing out a fifty grain test specimen, inserting it in a test chamber, compressing it to a constant volume and subjecting the sample to a flow of air, and measuring and correlating the air flow to a scale reading in Micronaire units. There is presently in use a manually operated apparatus covered in part by U.S. Patent No. 2,593,957 and a semi-automatic model disclosed by our patent application, Serial No. 613,242, now Patent No. 2,919,573.

It is an object of this invention to provide a method of and an apparatus for measuring fiber permeability by measuring the basic qualities that determine permeability and from these qualities calculate the permeability of the measured sample.

Laminar or nonturbulent flow through a porous medium is controlled by Darcy's law. According to Darcy's law the permeability $$k = \frac{QL}{A \Delta P}$$

wherein Q is the flow rate, A is the cross-sectional area of the sample, L is the length of the sample, and the pressure difference across the sample is $\Delta P$.

The following expression may be derived from Darcy's law (see M. Muskat. The Flow of Homogenous Fluids Through Porous Media, McGraw & Hill, New York, 1946):

$$k = \frac{2uQmL}{\gamma A (P_1^2 - P_2^2)}$$

where $k$ is the permeability, $u$ is the viscosity of the fluid, $Qm$ is the mass rate of gas flow, L is the length of the sample, $\gamma$ is the density of the gas, A is the cross-sectional area of the sample, $P_1$ is the absolute pressure at the inlet, and $P_2$ is the absolute pressure at the outlet of the sample.

Of course, the permeability of fibrous materials such as cotton would depend on its bulk density; hence, if the bulk density of a uniform lot of cotton is constant its permeability would be constant and would not depend upon the size of the sample, the fluid used to measure the permeability, or any other condition of measurement. A standard bulk density must, therefore, be established; and the one selected for this method and apparatus was the same as that for the Micronaire, 0.252 gm./cc. Of course, other constant bulk densities could be selected in the use of this theoretical formula. Using air as the test gas and using a test chamber having a one inch cross-sectional area the formula can be reduced, keeping in mind that the length of the sample is in direct proportion to the weight of the sample since the bulk density is kept constant, to the following:

$$k = \frac{0.946 W Q m}{\Delta P^2}$$

where W is the weight and for brevity, $P_1^2 - P_2^2$, is denoted as $\Delta P^2$.

By experiment it was found that because of the pressure drop across the sample holder itself, which experimentally increased with $Qm$ even with no sample in the holder, that Darcy's law would take the form of:

(1) $$k = \frac{0.946 W Q m}{\Delta P^2 - \Delta P o^2}$$

Where $Po$ is the pressure drop across the sample holder with no sample in the holder. The formula above would take this form since the denominator in Darcy's law is a function of the pressure drop across the sample while $\Delta P^2$ is our measured drop which includes both the pressure drop across the sample and the sample holder.

It was found that $\Delta Po^2$ increased lineally with $Qm$ and was a straight line the slope of which is designated as $\lambda$, which is a constant of the instrument. Therefore, the formula may be stated as:

(2) $$k = \frac{0.946 Q W m}{\Delta P^2 - \lambda Q m}$$

It was found that the permeability $k$ may be calculated from the above formula and for rates of flow less than about 0.2 gm. of air per second, $k$ shows no consistent increase or decrease and thus it appears that Darcy's law is being followed for flows within this range. However, it is difficult to measure the variables in this low range of flow and it is desirable to measure the flow and pressure variables for larger rates of flow. However, it was found that Darcy's law was not applying for larger rates of flow since the flow was not laminar but was turbulent.

Therefore, it was necessary to develop by experiment a formula wherein the permeability will not vary but remains constant. By experiment, testing the various variables, it was found that the permeability varied with $Qm$ although not in a direct proportion but to a 1.5 power and thus the fundamental formula was found as follows:

(3) $$K = \frac{(0.946)(Qm)^{1.5}(W)}{\Delta P^2 - \lambda Qm}$$

Where the factors of the equation are the same as those that have been previously identified except that K denotes the permeability of the sample measured for flow volumes above 0.4 grams of air/sec. where Darcy's law does not hold. Therefore, this last formula 3 applies to turbulent flow through a cotton sample for rates of flow greater than 0.3 but less than 1.5 (maximum rate observed) grams of air per second. Therefore, the permeability of cotton may be determined by measuring the three variables, P, $Qm$ and W for each sample.

In order to simplify the method of measurement and in order to simplify the apparatus required to perform this measurement one or more of these variables may be held constant during measurement tests thereby limiting the number of measurements required and reducing the amount of time required to perform a test. However, it is desirable not to perform a manual weighing operation to secure a uniform sided sample because of the time and labor required. Therefore, using a variable W there are four possible methods of obtaining data for the variables, $\Delta P$ and $Qm$: (1) hold $Qm$ constant and measure $\Delta P$, (2) hold $\Delta P$ constant and measure $Qm$, (3) hold neither constant, and measure both $Qm$ and $\Delta P$, (4) establish a condition so that there exists an equation between ΔP and Qm, then a function ΔP=f(Qm) would exist such that when Qm is measured ΔP would be determined.

It has been found preferable to hold the pressure differential, ΔP, across the sample measure constant. The only measurements then required are the weight, W, and the air flow rate, Qm, through the sample. However, since the weight W will not be constant, provision will have to be made to vary the volume of the test chamber in order to maintain the preselected bulk density of 0.252 cc./gm.

Therefore, the Formula 3, which has been found applicable to turbulent flow, provides an accurate measurement of the permeability of a sample and this measurement may be correlated with standard scales or used by itself to provide an indication of the fineness of the measured samples.

Therefore, a further object of the present invention is the provision of a method of and apparatus for determining fiber permeability by holding one or more of the variable basic qualities of measurement of the permeability constant thereby requiring a minimum number of measurements to determine the permeability of a sample.

Another object of the present invention is to provide an apparatus which automatically and quickly measures the basic qualities determining permeability and calculates the permeability of the measured sample.

Yet a still further object of the present invention is the provision of a method of and an apparatus for determining fiber permeability which will weigh a variable weight sample, measure the rate of air flow through the sample at a fixed bulk density, and solve a formula for the permeability of the test sample.

A still further object of the present invention is the provision of a method for and an apparatus of measuring fiber permeability which accepts a variable weight sample and adjusts a variable volume sample holder in relation to the weight measurement so that the bulk density of all the measured samples are the same, measures the flow of gas through the sample, calculates the permeability of the measured sample and correlates the resultant permeability with the standard Micronaire scale.

Yet a further object of the present invention is the provision of a method for and an apparatus of measuring fiber permeability by selecting a test sample, weighing said sample, adjusting the length of a sample holder according to the weight measurement so that when the sample holder is in its closed position the bulk density of the measured samples is a predetermined constant, placing the sample in the sample holder and compressing the sample to the predetermined bulk density, passing air through the sample at a predetermined constant pressure drop across the sample, measuring the rate of gas flow through the sample, and calculating the permeability of the measured sample.

A still further object of the present invention is the provision of an apparatus for testing fiber permeability which will automatically test two samples simultaneously of various weights, calculates their permeabilities, and prints out the Micronaire value of the measured samples.

Other and further objects, features and advantages will be apparent from the following description of presently preferred embodiments of the invention, given for the purpose of disclosure, and taken in conjunction with the accompanying drawings, where like character references designate like parts throughout the several views and where:

The apparatus generally includes a center section 12 having a weighing scale 22 for weighing the sample 11, a flow meter 62 to measure the mass rate of gas flow through the sample and a computer 45 for receiving the weight and mass rate of flow measurements and solving the obtained formula for the permeability of the measured sample. The right section 14 and left section 16 of the apparatus are identical and work on a staggered operation cycle to provide a faster operation. Each of the right and left sections 14 and 16 includes a test chamber and a variable positioned plunger which moves down into the test chamber and compresses the sample to the selected fixed density. The operating position of the variable fixed density. The operating position of the variable center plunger is actuated and controlled by the weight signal coming from the weighing station through a servo-mechanism system. Therefore, the variable center plunger is positioned according to the weight of the measured sample in order to adjust the volume of the test chamber in its closed position so that the bulk density of all measured samples will be the same. By a series of timing cams the sample is transferred from the weighing station after the weighing operation to either the right or left section 14 or 16 and into a test chamber through a suction channel. Then the variable center plunger which has been adjusted according to the weight of the sample moves into the test chamber and compresses the sample to the selected constant density, and a sliding plate having a gas supply line is moved into position at the opposite end of the test chamber from the plunger and a fixed pressure differential is applied across the test chamber. The gas line is connected to the flow meter which then measures the mass rate of gas flow through the sample and the test chamber. This mass rate of gas flow measurement, Qm, is sent to the computer which has already received the weight signal, W, from the weighing station. With these two variables the computer calculates the permeability of the measured sample, transfers this calculation to a printing wheel which may be calibrated in Micronaire units, and a ticket is printed with the cotton fineness determination of the measured sample. The gas supply line is then removed from the end of the test chamber by the movement of the index plate, the plunger is stationed in a partially raised position and a gas vent in the side of the test chamber is actuated blowing the measured sample out of the test chamber through the discharge station of the side plate. By the alternate use of the right and left sections of this apparatus the operation of the machine may be staggered so that one sample can be in the process of being discharged followed by the next sample being loaded into one test chamber at the same time the other test chamber is subjecting a sample to the air flow test and printing the results on the ticket.

Figure 1:
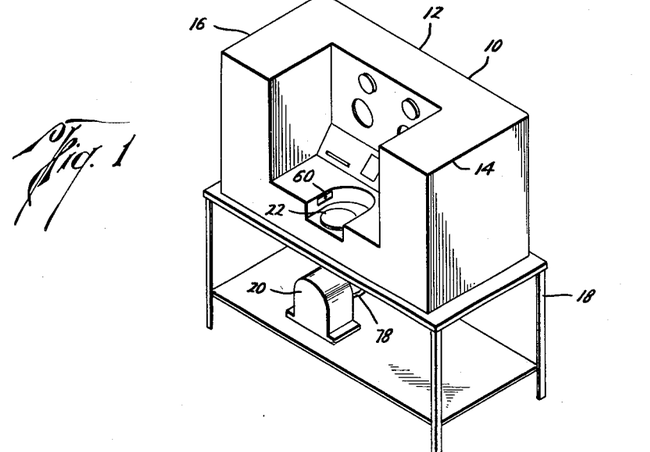
FIGURE 1 is a perspective view illustrating an apparatus according to the invention having a single weighing station but having two sample holder or test chamber stations.

Referring now to the drawings, and particularly to FIGURES 1, 2, 3, 4 and 5, the apparatus indicated generally by the numeral 10 of the present invention includes a center chassis 12 and a right end left chassis 14 and 16 which are identical, all of which may be suitably mounted on a roller table 18 which provides additional support for a suction motor 20 (FIGURE 1).

Figure 2:
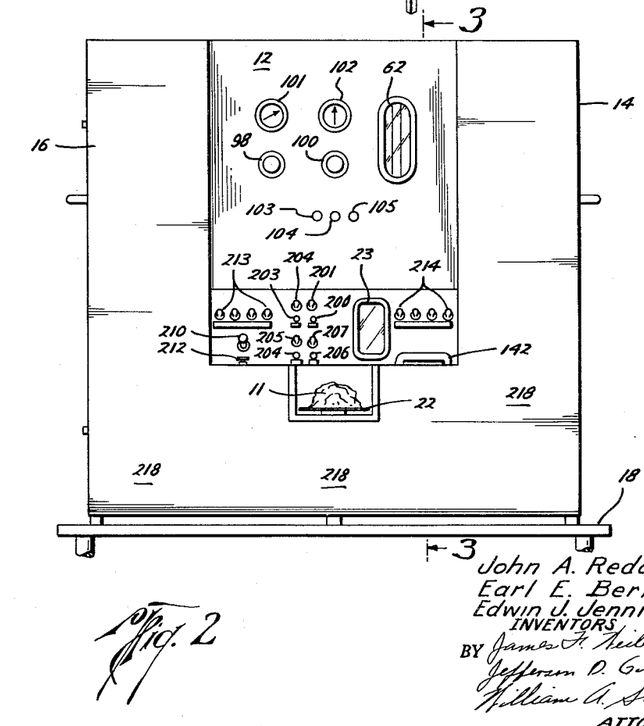
FIGURE 2 is a partial front elevational view of the apparatus illustrated in FIGURE 1.
Figures 3, 6:
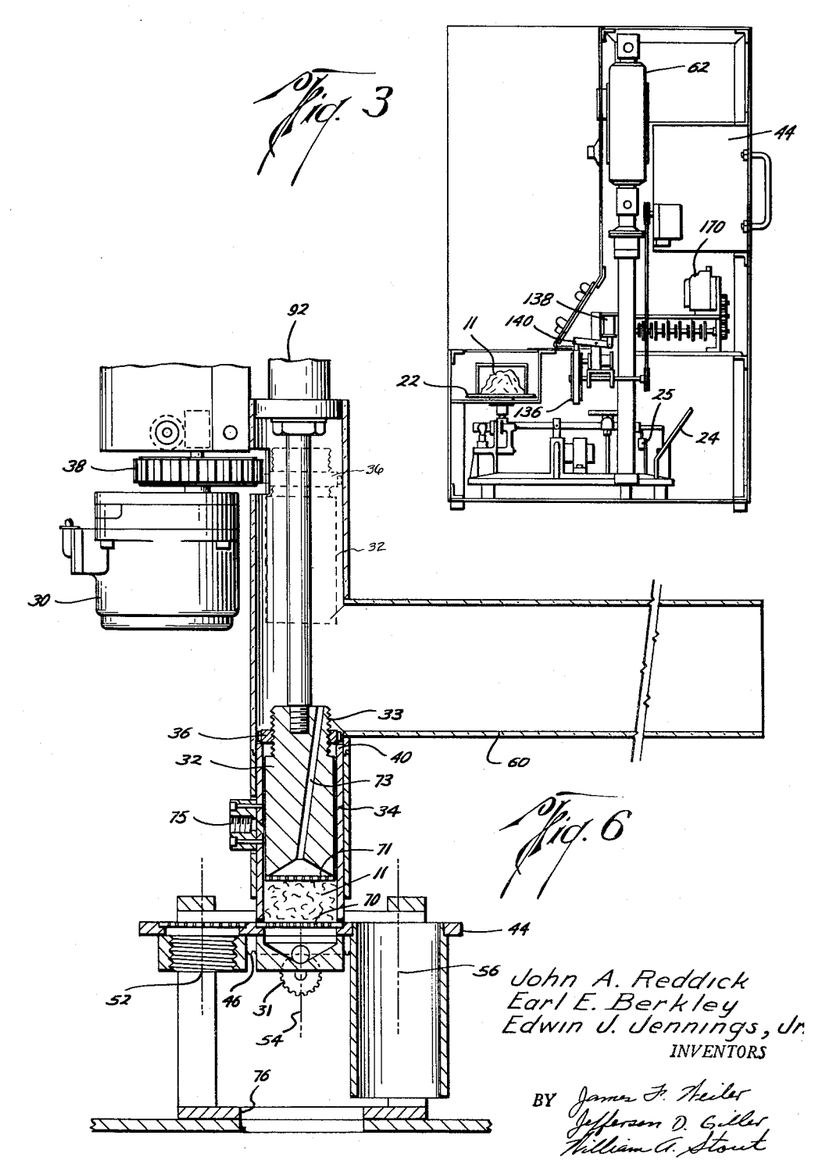
FIGURE 3 is a cross-sectional view taken along the line 3—3 of FIGURE 2.
FIGURE 6 is a cross-sectional view taken along the line 6—6 of FIGURE 5 illustrating a test chamber.
Figure 5:
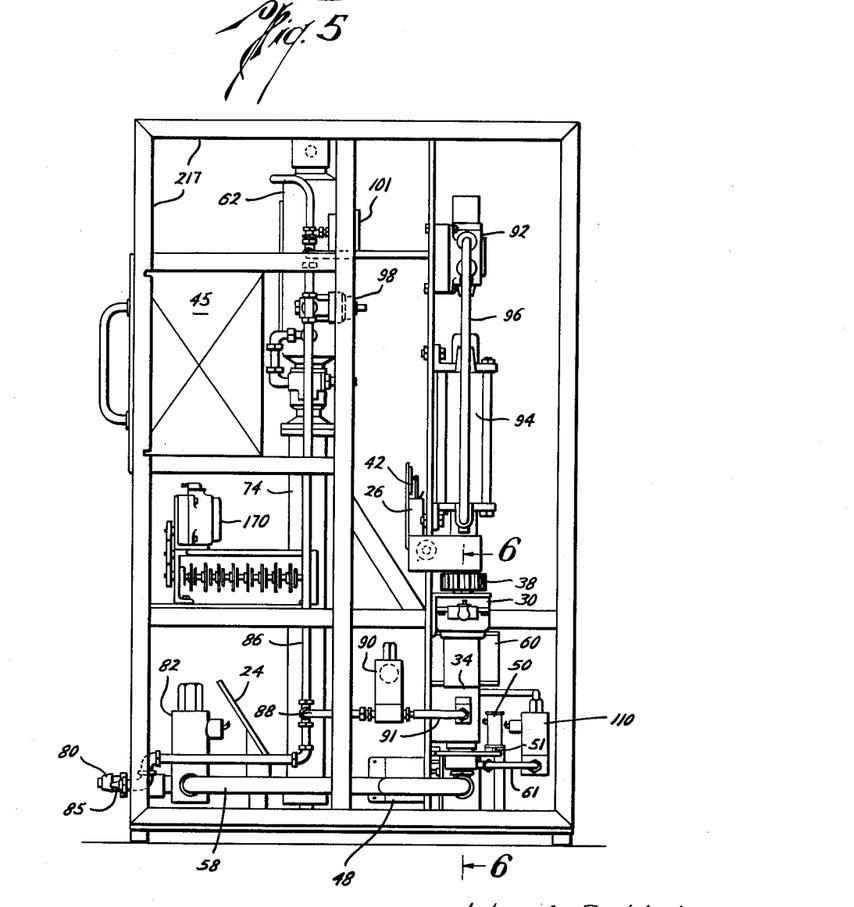
FIGURE 5 is a partial side elevational view with the panels removed illustrating the present invention.

A scale 22 is provided in the center section 12 for the weight measurement of various sizes of testing samples and may be of the type manufactured by the Exact Weight Scale Company, 538 East Town Street, Columbus 15, Ohio, Model 4104–A–OT Exact Weight Shadograph. The scale reading may be read on the visual scale 23 (FIGURE 2) through the optical system and reflecting mirror 24 (FIGURES 3 and 5). The scale 22 is moved to a new position as it weighs a sample and changes the position of a rod core of transducer 25 (FIGURES 3, 9B and 10) which is connected to the scale 22.

The transducer 25 is alternately electrically connected in a servo circuit with one of the test chambers in either the right or left chassis depending on the cycle of operation. For convenience of reference, identical numbers are applied to both the right and left chassis components except that the reference letter "a" has been added to the numbers in the right chassis section 14. Accordingly, in describing these sections, reference will be made to only one of the side sections but it will be understood that both chassis sections are identical and utilize the same reference numerals with the exception of the reference letter.

Figure 4:
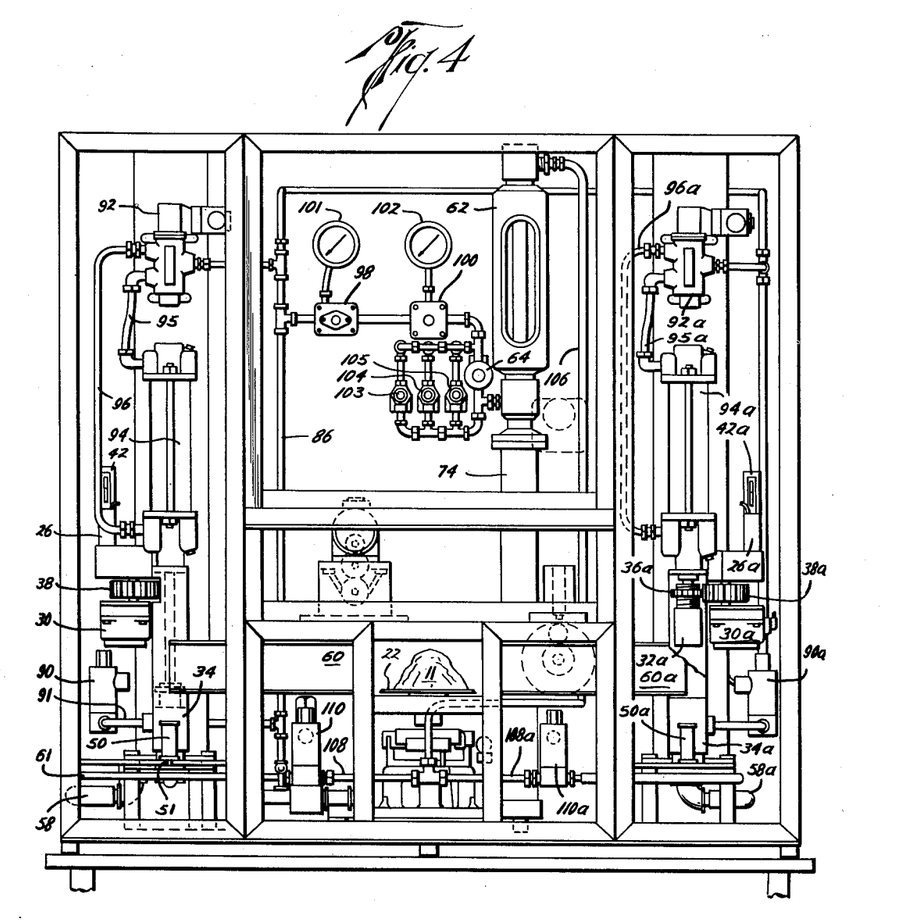
FIGURE 4 is a partial elevational view with the panels removed illustrating the apparatus illustrated in FIGURE 1.

Referring now to FIGURES 4, 5 and 6 and assuming the sequence of the operation applies to the left chassis 16 the transducer 25 (FIGURE 3) is therefore connected to the servo circuit in the left chassis 16. The movement of the scale platter 22 causes an unbalance in the servo circuit which contains the scale transducer 25, the transducer or weight adjusting differential transformer 26 (FIGURES 4 and 5), the amplifier 28 (FIGURES 9B) and the weight adjusting servomotor 30 (FIGURES 3, 4, 5, 6 and 9A). Since the servomotor 30 is electrically connected to the rod core of scale transducer 25, the circuit unbalance is fed into the amplifier 28 causing the servomotor 30 to turn seeking a new circuit balance position corresponding to the weight signal received from the scale 22.

As best seen in FIGURE 6, a variable positioned plunger 32 is adapted to be moved into and out of a test chamber or sample holder 34 by pneumatic means which will be more fully described hereinafter. When the plunger 32 is in the up position, here shown as dotted, the collar 36 which is threadably secured on the upper end of the head of plunger 32 is meshed with the motor pinion 38 of the servomotor 30. Thus when the weight signal circuit causes the servomotor 30 to turn seeking a new circuit balanced position the servomotor 30, since it is interlinked with the collar 36 when the plunger 32 is in the up position, turns and positions the collar 36 on the coacting threads 33 on the plunger 32 according to the weight of the sample 11 on the scale 22. Therefore, the travel of the plunger 32 into the test chamber 36 is limited when the collar 36 is seated on the upper shoulder 40 of the test chamber. Thus the volume of the test chamber 36 is adjusted depending upon the weight of the sample 11 so that all measured samples will be compressed to a constant bulk density.

Figure 9A:
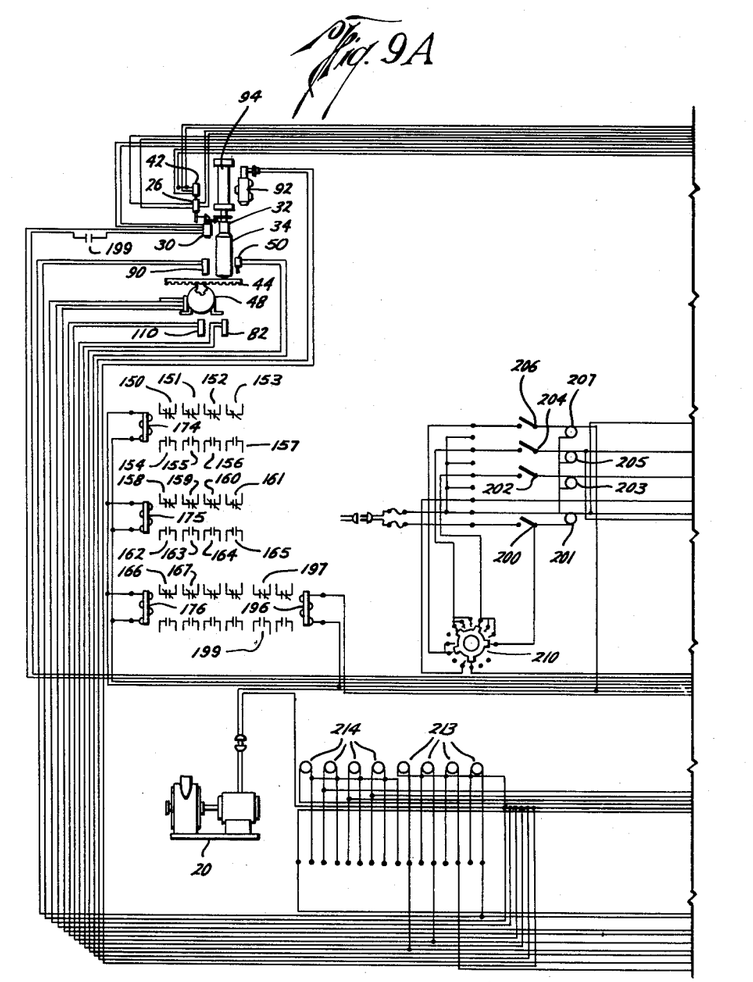

As best seen in FIGURES 4 and 5 and 9A, a potentiometer 42 is also actuated by the servomotor 30 and thus also reflects the new position of the scale 22 caused by the weight of the sample 11 placed thereon. The position of the weight potentiometer 42 therefore is a direct indication of the weight of the sample 11 and this weight signal, W, is electrically connected to and sent to a receiver computer 45 (FIGURES 5, 9B and 10) to await the mass air flow weight measurement, $Qm$, for computation of the permeability as will be more fully hereinafter described.

The weight adjusting differential transformers or transducers 25 and 26 may be a model 6208–A as commercially available from the Automatic Temperature Control Company, Inc., 5200 Pulaski Avenue, Philadelphia 44, Pennsylvania. The weight adjusting servomotor 30 is commercially available from the Minneapolis Honeywell Regulator Company, Philadelphia, Pennsylvania as part No. 76750–3.

Figure 7:
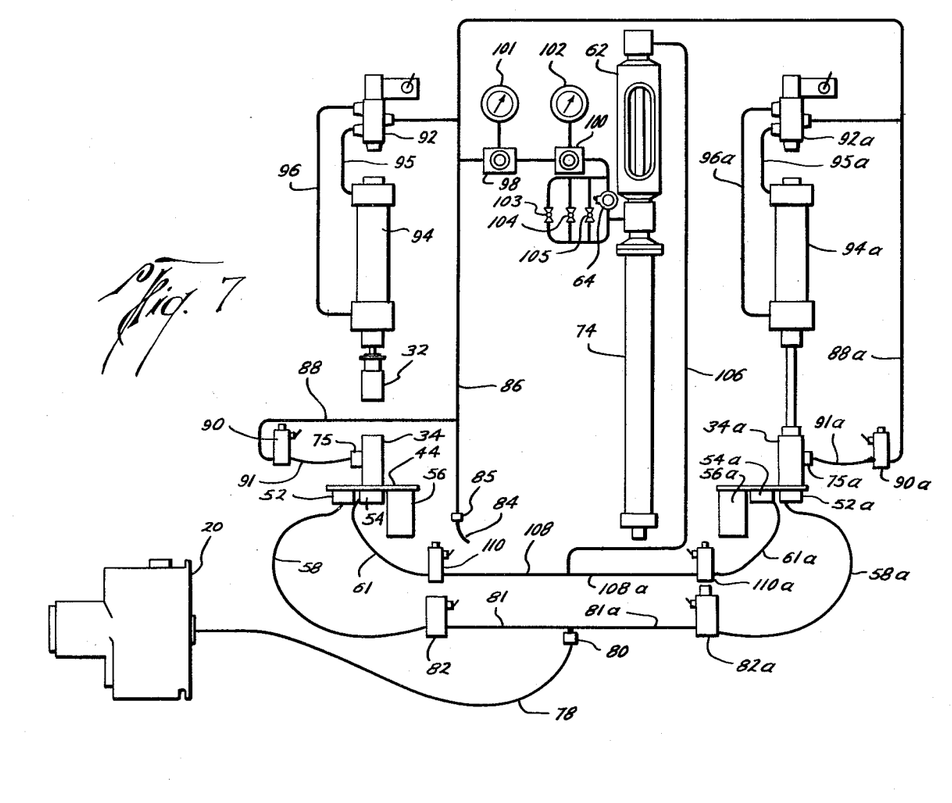
FIGURE 7 is a diagrammatic drawing illustrating the pneumatic flow system of the present invention.

Referring again to FIGURES 4, 5, 6, 7 and 9A, a slide index plate 44 is positioned at the bottom end of the test chamber or sample holder 34. Plate 44 is moved across the bottom end of the test chamber 34 by a pinion 31 and rack 46 assembly operated by a drive motor 48. Stop pin 51 which is adapted to engage the slide plate 44 and the stop solenoid 50 which actuates and controls the stop pin 51 act to control the limit of travel of the index plate 44 by engaging or releasing plate 44 at the desired position. As best seen in FIGURES 6 and 7 the slide index plate 44 includes three stations 52, 54 and 56 which are the suction position, test position, and discharge position, respectively. At the time of the weighing cycle the suction position 52 is adjacent the lower end of and axially aligned with the test chamber 34 and after the weighing operation has been completed the pneumatic system (to be discussed later) causes a suction through the suction station 52 through the suction hose 58 (FIGURES 4 and 5) and pulls the sample 11 from the scale 22 through the passageway 60 (FIGURES 1, 4, 5 and 6) into the test chamber 34.

After the sample 11 has been pulled into the test chamber 34, the slide index plate 44 moves and positions the test position 54, as shown in FIGURE 6, at the bottom opening of the test chamber 34. After the newly positioned plunger 32 has been moved down by the pneumatic system to compress the weighed sample 11 in the test chamber 34 to the preselected bulk density, a test hose 60 (FIGURES 4 and 5) which is connected to the test station 54 directs air pressure from the flow meter 62 and the flow meter solenoid valve 64 (FIGURES 4, 7 and 9B) through the sample 11 in the test chamber 34. The test station 54 includes a series of ports 70 to pass the gas pressure through the compressed sample. The plunger head 32 includes a series of outlet ports 71 and an exhaust port 73 through which gas escapes after passing through the sample 11. In this test position 54 the gas flow rate through the sample 11 is measured by the flow meter 62 and the measurement transmitted by the flow meter transmitter 74 through a servomechanism system to the receiver computer 45 to be combined with the weight signal to provide the solution for computing the permeability of the sample.

After the computer solves the derived equation for the permeability of the measured sample from the values of the weight W and the air flow mass $Qm$ and the cotton fineness value is printed on a ticket (which will be more fully described hereinafter), the flow of gas through the sample 11 in the test chamber 34 is stopped, the plunger 32 returns to its up position, the stop solenoid 54 lifts the stop pin 51 and the slide index plate 54 is moved so that the discharge position 56 (FIGURE 6) is adjacent the lower end of the test chamber 34. Air under pressure from the pneumatic system enters the side port 75 of the test chamber 34 and is directed downwardly against the sample 11. The plunger 32 moves down momentarily to seal off the top of the test chamber 34 allowing the air from the port 75 to blow the sample 11 down and out the discharge duct 76. After the air flow through the port 75 is stopped, the slide index plate is moved back to the suction position 52 and the test chamber components are in position for another cycle.

Referring now to FIGURE 7, the gas flow system diagram for the entire apparatus including the suction, exhaust, plunger actuating, and flow gas measurement systems for both chassis 14 and 16 may be seen, which preferably is a pneumatic system. The system will be described with reference to the components in the left chassis 16 but it will be understood that both chassis sections are identical and utilize the same reference numerals with the exception that the reference letter "a"

has been added to the numbers in the right chassis section 14 and that the gas flow measurement and the suction systems are common to both the right and left chassis sections.

The suction blower 20, which pulls the sample 11 from the scale 22 into the test chamber 34 may be of the type commercially available from the Spencer Turbine Company, Hartford, Connecticut as the type No. 120½–U. The suction blower 20 is connected by an external hose connection 78 (FIGURES 1 and 7) to the nozzle connection 80 (FIGURES 5 and 7) and then into a conventional T to suction lines 81 and 81a which are connected to suction solenoid valves 82 (FIGURES 5 and 7) and 82a, respectively. A flexible suction hose 58 is connected from the solenoid valve 82 to the suction station 52 (FIGURES 6 and 7) on the slide index plate 44 thereby providing a suction pull at station 52 which is controlled by the solenoid valve 82.

A supply of air from any conventional air source, preferably about 85–100 p.s.i., is supplied through the hose connection 84 to a connector 85 (FIGURES 5 and 7) for the exhaust, plunger actuating, and flow meter test systems. From the main air supply line 86 through a conventional T, an exhaust line 88 (FIGURES 5 and 7) is connected to a discharge solenoid valve 90 (FIGURES 4, 5 and 7) which controls the flow of air through the tubing 91 (FIGURES 4, 5 and 7) to the side exhaust port 75 of the test chamber 34 (FIGURES 6 and 7).

Also connected to the main air supply line 86 by a conventional T is a four-way solenoid actuated air valve 92 (FIGURES 4, 5 and 7) which actuates and controls the movement of the variable position plunger 32 in and out of the test chamber 34 by actuating and controlling a double-acting center piston air cylinder 94 through air lines 95 and 96 which is connected to the variable position plunger 32.

The air flow testing system is also connected to the main supply line 86 and the primary air supply is passed through a primary air reducing valve 98 (FIGURES 4, 5 and 7) which reduces the air supply down to approximately 45 p.s.i. which is then passed through a secondary air reducing valve 100 (FIGURES 4 and 7) where the air supply is further reduced down to 6 p.s.i. Indicating air gauges 101 and 102 (FIGURES 2, 4 and 7) are provided at valves 98 and 100, respectively, to indicate said air pressure. The 6 p.s.i. air supply is then connected to a parallel system comprised of flow meter calibration orifice and testing buttons 103, 104, 105 and the flow meter solenoid valve 64 which controls the supply of 6 p.s.i. air pressure to the flow meter 62 (FIGURES 4, 5 and 7). From the flow meter 62 the testing air passes through tubing 106 and to branch tubing 108 and 108a, which are connected to testing solenoid valves 110 and 110a, respectively (FIGURES 4, 5 and 7). A flexible air hose 61 is connected between the test solenoid valve 110 (FIGURE 5) and the test station 54 for passing air through the sample 11 when it is compressed in the test chamber 34 (FIGURE 6).

The solenoid operated valves 64, 82, 90 and 110 are commercially available and the type V-5, normally closed, two-way valves, from the Skinner Electric Valve Division, the Skinner Check Company, 95 Edgewood Avenue, New Britain, Connecticut are satisfactory. The four-way valve 92 and double acting air cylinder 94 are commercially available from Scovill Manufacturing Company, Inc., 470 Vanderbilt Avenue, Brooklyn, New York.

After the weighing and air flow test measurements are obtained, the weight and air flow signals are sent to a receiver-computer 45 (FIGURES 9B and 10) which solves the equation $$K = \frac{0.946 Q_m^{1.5} W}{\Delta P^2 - \lambda Q_m}$$

Figure 9B:
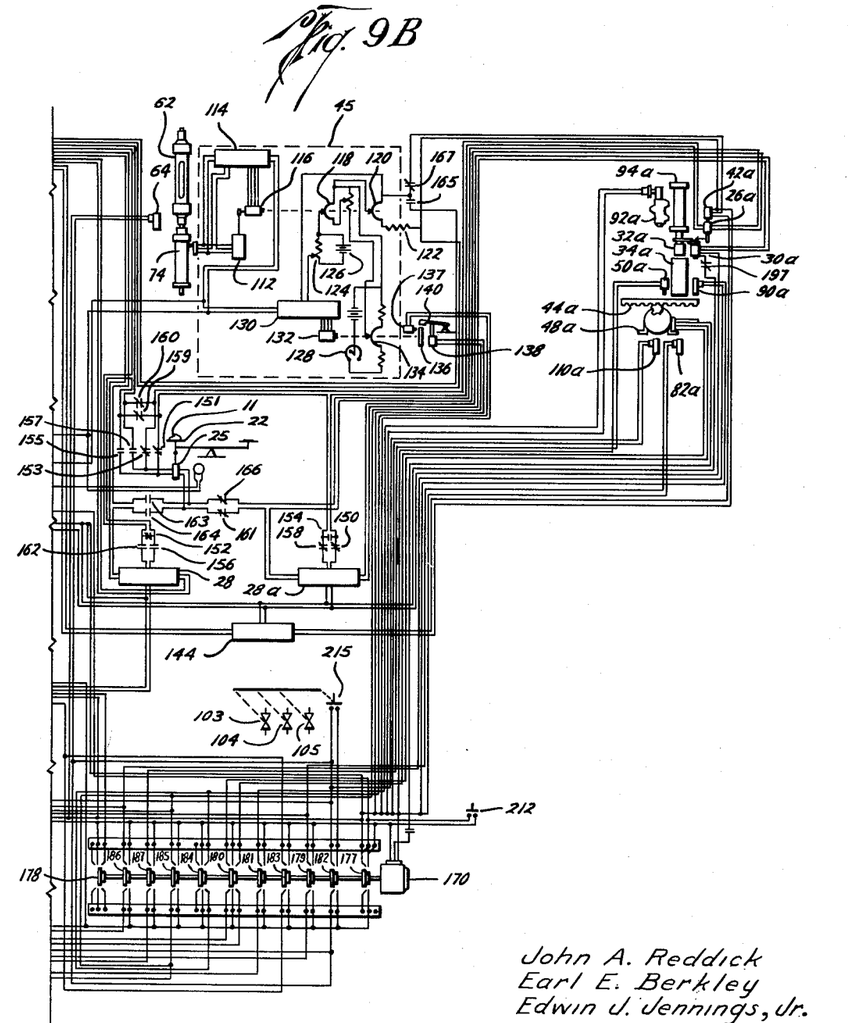
Figure 10:
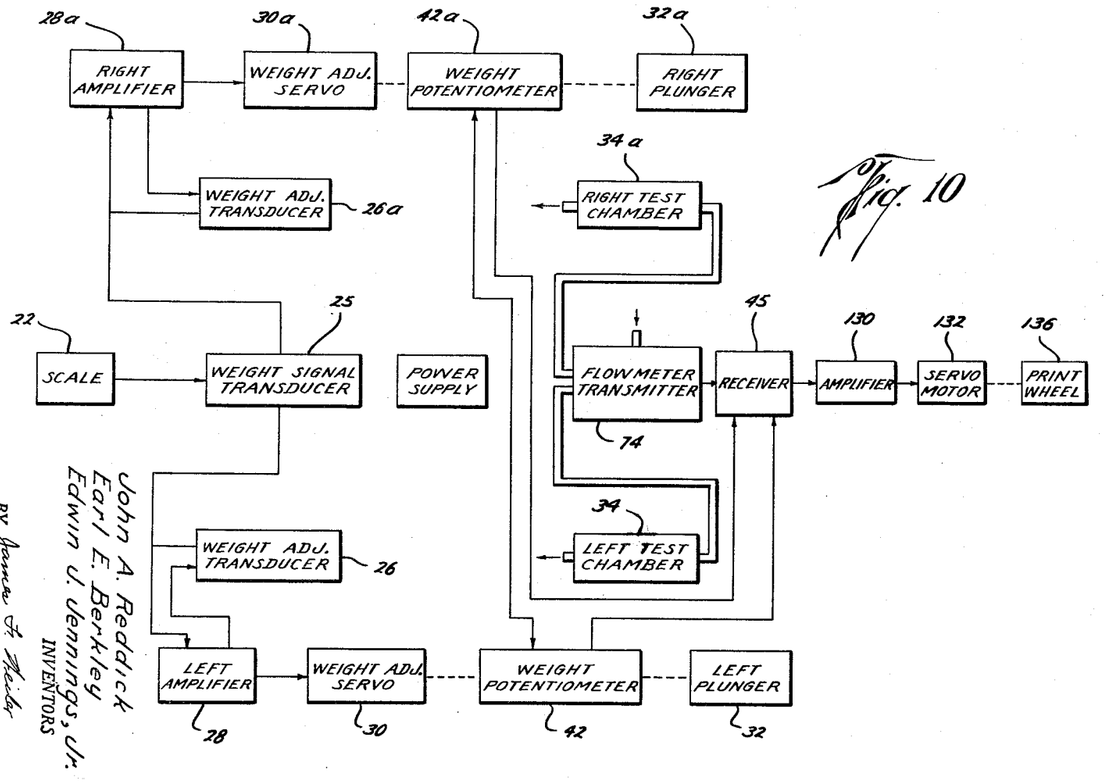
FIGURE 10 is a schematic block diagram illustrating the present invention.

A receiver set up to solve this equation is shown in FIGURE 9B wherein the flow meter transmitter 74 feeds its signal into a flow meter receiver 112 which is arranged in a servomechanism system comprised of a transmitter 74, the receiver 112, an amplifier 114 and a servomotor 116 whose shaft is adjusted as is conventional in servomechanism systems to restore the system to null and is positioned therefore according to the signal input $Q_m$. Servomotor shaft 116 is mechanically coupled to and moves potentiometers 118 and 120. The potentiometer 118 is of linear calibration and the potentiometer 120 is characterized to the 1.5 power. The weight signal is received and passed through the resistor 122 and diminishes to 94.6% of the original signal. This weight signal is then impressed on the potentiometer 120 and the numerator of the equation $W \times .946 \times Q_m^{1.5}$ is established. The denominator consists of $\Delta P^2$ which is the measured pressure drop through the sample which is a constant and is set into the receiver 45 manually by adjusting the potentiometer 124 which sets the proper voltage signal from the standard cell 126. $Q_m$ is subtracted from the $\Delta P^2$ through the potentiometer setting on 118 by a negative D.C. voltage through the potentiometer 118 and a slide wire 128 is provided for the adjustment of $\lambda$, the system constant. The division of the numerator by the denominator is done by the comparative circuit including the servo amplifier 130 which moves the servomotor 132 as the quotient is read on potentiometer 134.

Print wheel 136 is connected to and is indexed by the servomotor 132 to reflect the answer computed by the receiver-computer 45. The print wheel 136 may be calibrated in terms of the standard Micronaire cotton fineness value. The printer solenoid 138 actuates the hammer 140 and prints the fineness value on the ticket which has been inserted between the print wheel 136 and the hammer 140 through the instrument panel ticket chute 142 (FIGURE 2).

Figure 8:
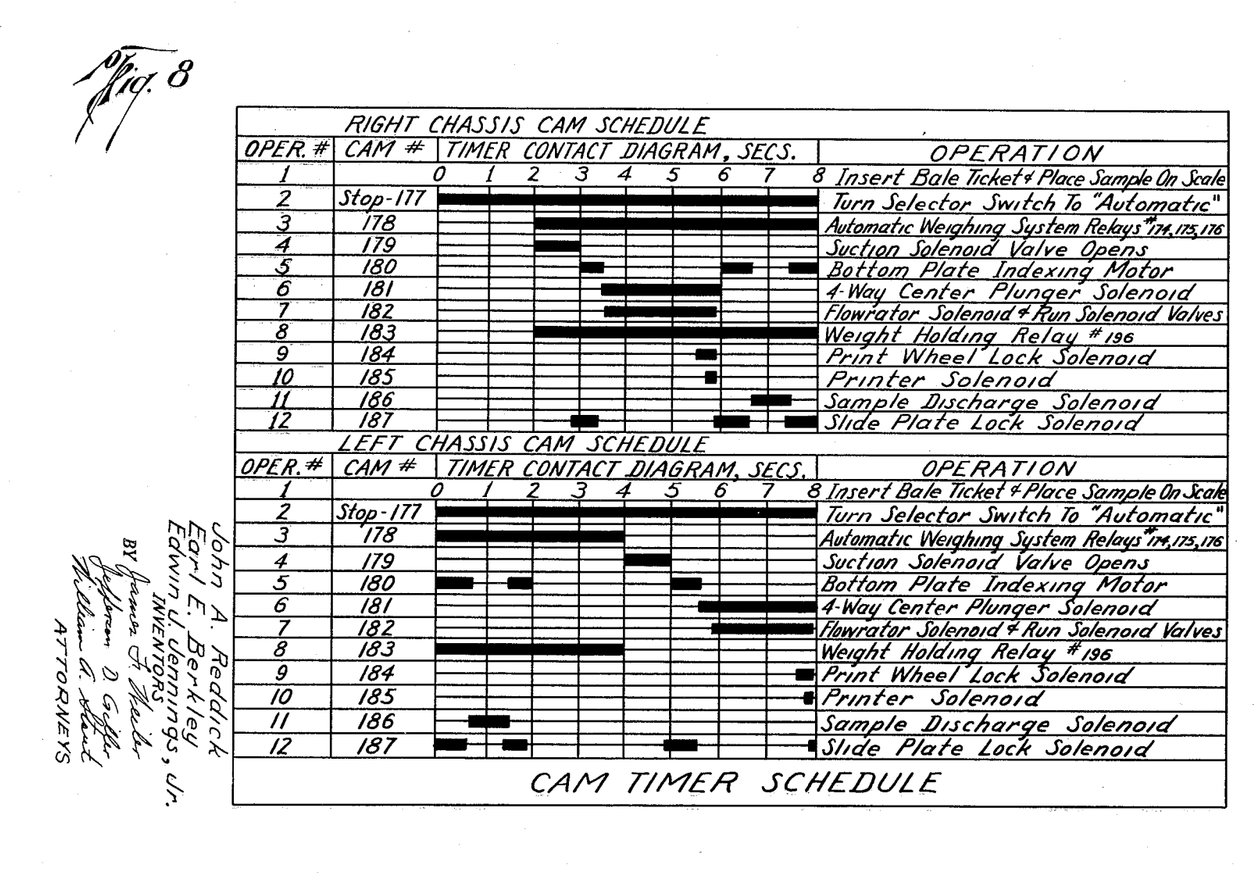
FIGURE 8 is a cam timer schedule illustrating the cam timer contacts period of operation for each of the sample holder sections of the device illustrated in FIGURE 1, FIGURES 9A and 9B are electrical schematic diagrams, which when combined, illustrate the electrical wiring diagram of the apparatus illustrated in FIGURE 1.

In addition, as best seen in FIGURES 9A and 9B, various electrical cams, relays, and switches are provided to make the operation of this apparatus fully automatic. A timer drive motor 170 (FIGURES 3, 5 and 9B) is provided which rotates at preferably one revolution in 8 seconds and is commercially available as a series 2400 timer from the Automatic Temperature Control Company, 5200 Pulaski Avenue, Philadelphia, Pennsylvania. This timer drive motor drives a series of cams wherein 177 is the cam timer motor stop cam, 178 is the automatic weighing system cam, 179 is the suction solenoid valve cam, 180 is the plate indexing motor cam, 181 is the four-way center plunger solenoid cam, 182 is the flow meter solenoid and test solenoid valves cam, 183 is the weight holding relay cam, 184 is the print wheel lock solenoid cam, 185 is the printer solenoid cam, 186 is the sample discharge solenoid cam, and 187 is the slide index plate lock solenoid cam. The cam contact schedule is shown in FIGURE 8 for both the right and left chassis on an 8 second cycle.

Power relays 174, 175, 176 and 196 are provided and may be of the type KL5A, available from Potter and Brumfield, Inc., Princeton, Indiana. The unnumbered contacts of these relays are spares that are not used.

The following switches and lights are located on the panel board of the center chassis section 12 (FIGURE 2) as well as in the electrical circuit diagrams, FIGURES 9A and 9B. Switch 200 is the main 110 volt 60 cycle power switch and has an indicating light 201. Switch 203 controls the power to the electric scale 22 and has an indicating light 204. Switch 204 controls the power to the suction blower 20 and has the indicating light 205. Switch 206 is the main switch for the amplifiers and has an indicating light 207. Switch 210 is the operation selector switch for "manual," "off," or "automatic" operations. Switch 212 is the manual start switch button for manual single sample operations. Lights 213 are the left chassis 16 indicating lights and the lights 214 are the right chassis 14 indicating lights for the "suction," "test," "print," and "discharge" portions, respectively, of the cycle. Push button switch 215 is a calibration button switch for the flow meter 64. D.C. power supply 144 is a conventional power supply which is available commercially and supplies the left and right weight potentiometers 42 and 42a.

A suitable mounting frame 217 and suitable panels 218 may be provided to support the components and provide a compact portable instrument for measuring the fineness of fibrous materials. For lightness the frame may be of welded aluminum angle frames and the panels may also be of aluminum.

In use, after the fiber fineness machine 10 has been calibrated and connected to the required electrical power sources, electrical energy is applied first by closing the main power switch 200, the weight scale light switch 202, suction blower switch 206, and amplifier switch 204. Each of the above operations will be visible by means of the respective individual indicating lights 201, 203, 207 and 205 (FIGURES 2 and 9A). By closing the above-named power switches voltage has been applied to the flowmeter transmitter 74, flowmeter receiver 112, amplifiers 28, 28a, 114, and 130, D.C. power supply 144, servomotors 132, 116, 30, 30a, differential weight transformers 25, 26, and 26a, and weight signal potentiometers 42 and 42a. A ticket (not shown) is placed in a ticket chute 142 (FIGURE 2) which places the ticket between the print wheel 136 and the printing hammer 140 (FIGURES 3 and 9B).

Referring particularly to FIGURES 9A and 9B the following sequence of operation applies to the right chassis 14. For simultaneous operation of the left chassis 16 refer to the cam timer schedule of FIGURE 8. After a reasonable amount of time has elapsed to allow the instrument to warm up, the operator takes a sample of cotton 11 in hand and places it on the scale 22. The cotton sample 11 should preferably weigh between 4 and 10 grams which is heavier than the fifty grain test specimen commonly used in other instruments at the present time, but it is felt that this range will test a more representative sample than the smaller test specimen. At this time the slide index plate 44 is in the position with the suction station 52a under the test chamber 34a and the variable position plunger 32a is in the up position (FIGURES 4 and 7). The operator moves the selector switch 210 to the automatic position and the cycle of operations will begin. The timer motor 170 is energized and begins its 8 second cycle. The scale platter 22 will move under the weight of the sample 11 and come to rest and its movement will change the position of the rod core of transducer 25 (FIGURES 3 and 9B) which causes an unbalance in the servo circuit containing the transducers 25 and 26a, the amplifier 28a, and the servomotor 30a. The weight adjusting servomotor 30a is connected to the rod core of transducer 26a and the circuit unbalance creates an input to the amplifier 28a causing the weight adjusting servomotor 30a to turn and seek a new circuit balance position. Since the servomotor 30a turns the gear 38a which meshes with the gears on the exterior of the collar 36a when the plunger 32a is in the up position (FIGURE 4) the servomotor 30a then positions the threaded collar 36a on the threads 33a on the plunger 32a according to the weight of the sample 11.

Weight potentiometer 42a (FIGURES 4 and 9B) is also connected to the shaft of the servomotor 30a and therefore reflects the new position of the scale platter 22 caused by the weight of the sample 11. The change on the potentiometer 42a is a direct indication of the weight W of the sample 11 and this weight data is now sent from the potentiometer 42a to the receiver-computer 45. Therefore, after the weighing cycle the variable position plunger 32a has been automatically adjusted so that when the plunger 32a is inserted into the test chamber 34a and the collar 36a is adjacent the upper shoulder 40a of the test chamber 34a the bulk density of the compressed sample 11 will be constant for all measured samples, here selected as 0.252 gm./cc. and the weight signal has been sent to the receiver-computer 45 to await the air mass rate flow measurement $Qm$.

After the collar 36a has been adjusted and the weight signal transferred to the computer 45, the weight holding cam 183 contacts close thereby energizing relay 196 opening the normally closed contact 197 which disconnects servomotor 30a but holds the weight signal W on the potentiometer 42a until the flowmeter 62 signal $Qm$ is available. During this weighing operation the slide index plate 44a has been locked in the suction position 52a by the stop pin 51a. Now, suction solenoid valve cam 179 contacts close energizing suction solenoid 82a (FIGURES 7 and 9B) allowing air from the suction blower 20 to pull the sample 11 from the scale platter 22 through the sample duct 60a and into the test chamber 34a. The suction solenoid valve cam contacts 179 then open de-energizing the suction solenoid 82a thereby stopping the air flow from the suction blower 20. The slide index plate solenoid cam contact 187 closes energizing the stop solenoid 50a which lifts the stop pin 51a thereby permitting movement of the slide index plate 44a. The index plate motor cam contacts 180 close energizing the index motor 48a which turns the pinion 31a which meshes with the rack 46a attached to the index slide plate 44a thus moving the index slide plate 44a to the test position 54a. The cam contacts 180 open stopping the index motor 48a and the index plate 44a, the locked solenoid cam contacts 187 open de-energizing the stop solenoid 50a thereby allowing the stop pin 51a to engage the index slide plate 44a in the test position 54a. At this point the test sample 11 is in the bottom of the test chamber 34a and the slide index plate 44a is in the test position 54a.

The four-way center plunger solenoid cam contact 181 closes energizing the four-way valve 92a causing the variable position plunger 32a to move downward as air flows through the double acting air cylinder 94a actuating the piston (not shown) connected to plunger 32a. The plunger 32a moves into the test chamber 34a until the collar 36a abuts the shoulder 40a and thus compresses the weighed sample 11 to the selected bulk density. The flowmeter solenoid valve cam contact 182 closes simultaneously with the cam contacts 183 energizing the solenoid valve 64 allowing the 6 p.s.i. air pressure to be introduced into the flowmeter 62 through the flowmeter solenoid valve 64 and through the test solenoid valve 110a which has also been actuated and thus through the test chamber 34a by means of the connecting tubing 61a, through the sample 11 and out into the atmosphere through air plunger exhaust port 73a. Thus the air flow rate through the sample 11 is measured by the flowmeter 62 and this data is transferred by the flowmeter transmitter 74 to the receiver-computer 45.

Thus with the W signal and the $Qm$, the only variables measured in this embodiment of the invention, the computer-receiver 45 is now ready to solve the Equation 3 for the cotton permeability value K.

In the computer 45, as best seen in FIGURE 9B, the weight signal W from the potentiometer 42a is passed through the resistor 122 which is a characterized resistor and which diminishes the weight signal to 94.6% of the original signal. The flowmeter transmitter 74 has fed the $Qm$ signal into the servoamplifier 114 which drives the servomotor 116. A matching transducer 112 in this servomechanism system is connected to the servomotor 116 and restores the null balance when the servomotor 116 is positioned in its new position determined by the $Qm$ signal. Servomotor shaft 116 is mechanically coupled to and carries potentiometers 118 and 120. The potentiometer 120 is characterized to the 1.5 power and thus automatically provides the quantity $Qm^{1.5}$ on this characterized slide wire potentiometer 120. The adjusted W signal is impressed across the potentiometer 120 and thus the resulting numerator, $.946WQ^{1.5}$, of the formula is now established.

In the denominator the equation member $\Delta P^2$ is the measured pressure drop through the sample. This measured pressure drop is a constant, here selected as 6 p.s.i., and is set into the computer 45 manually by adjusting potentiometer 124 which adjusts the proper voltage division of the standard battery cell 126. The $Qm$ in the denominator is obtained from the linear slide wire 118 which was set by the movement of the servomotor 116. The actual subtraction in the demoninator is caused by introducing a negative D.C. voltage value at the center tap line of the potentiometer 118. A slide wire 128 is also provided for the adjustment of $\lambda$, the system constant, which is determined by a trial comparison after assembly. This system constant, $\lambda$, is a measure of the pressure drop of the system with no sample in the chamber. Thus the denominator of the formula is established and the division is ready to be performed.

The final division of the numerator by the denominator is done in the servoamplifier 130. The slide on potentiometer 120 adjusts the dividend and the slide on potentiometer 118 adjusts the divisor and these values are reflected to the servoamplifier 130. The servomotor 132, electrically connected to amplifier 130, is moved by the quotient fed to the amplifier 130 and servomotor 132 moves to restore the system balance as its shaft moves null balance 134 which balances the quotient circuit. Also attached to the shaft of the servomotor 132 is the print wheel 136 which may be calibrated in Micronaire units.

Thus the print wheel 136 which is indexed by the quotient servomotor 132 reflects the value of fineness, which may be calibrated in terms of Micronaire, which is a measure of the permeability or fineness of the sample measured. After a predetermined sufficient time is allowed for the null balance condition or formula solution to be completed, the print wheel stop solenoid 137 is actuated and the printer solenoid cam contact 185 closes and energizes the printer solenoid 138 which prints the Micronaire value on the ticket.

Thus the test is complete and the apparatus is ready to complete the cycle so as to be ready for the next test sample. The slide plate lock solenoid cam contacts 187 close disengaging the stop pin 51a from the slide plate 44a. Flowmeter solenoid valve cam 182, the test solenoid cam 183, and the printer solenoid cam 185 contacts now all open thereby closing the flowmeter valve 64 and the test solenoid valve 110a stopping the flow of air through the sample 11 in the test chamber 34a. The four-way center plunger solenoid cam contact 181 opens reversing the flow of air to the double acting air piston cylinder 94a causing the plunger 32a to return to the up position leaving the top of the test chamber 34a open. Cam contact 187 closes energizing the stop solenoid 50a thereby lifting the stop pin 51a up and leaving the slide index plate 44a free to move. Motor cam contact 180 closes and the drive index motor 48a moves the slide index plate 44a to the discharge position 56a. Solenoid cam contacts 187 again open allowing the stop solenoid 50a to release the stop pin 51a and hold the index plate 44a in this discharge position 56a.

The sample discharge solenoid valve cam contact 186 closes actuating the discharge solenoid valve 90a allowing air to enter the side port 75a of the test chamber 34a and the four-way plunger cam contact 181 closes momentarily allowing the plunger 32a to move down and seal off the top of the test chamber 34a until the air entering the side of the test chamber 34a has blown the sample 11 down and out the discharge duct 76a and out of the apparatus 10. Again the cam contact 181 opens and the plunger 32a is reversed and moves up to its up position, cam contact 186 opens closing the discharge valve 90a stopping the flow of air into the side of the test chamber 34a. Cam contact 187 closes actuating the stop solenoid 50a lifting the stop pin 51a thus leaving the index plate 44a free to move. Motor cam contact 180 closes, the index drive motor 48 moves the slide plate 44a to the suction position 52a and the cam contact 187 again closes releasing the stop pin 51a so as to hold the slide plate 44a in the suction position. During this time the timer motor 170 has moved the timer cams a full revolution and the cycle is complete for the right chassis. As mentioned previously, the left chassis cycle of operation is identical to the above description for the right chassis cycle of operation and the cam timer schedule in FIGURE 8 sets forth the left chassis timing schedule.

Three calibration buttons 103, 104 and 105 have been provided to check the instrument calibration with standard values for 3.5, 4.4, and 5.6 Micronaire readings on the flowmeter 62. Depressing any one of these buttons closes the calibration button switch 215 thereby energizing the flowmeter solenoid valve 64 and the test solenoid valves 110 and 110a simultaneously thereby allowing an air flow through the calibration valve and orifice whose button has been pushed, through the piping 106, and through the test solenoid valves 110 and 110a to the atmosphere.

Thus, the fineness determination apparatus 10 will when using both the right chassis 14 and the left chassis 16 automatically test, compute, and print out the fineness value of a sample within a time cycle of four (4) seconds. Of course, by utilizing only the right or left chassis and the center chassis a reduced sample output cycle of eight (8) seconds per sample can be obtained. And by further simplification a manually weighed fifty grain sample utilizing only the center and right or left chassis can be utilized operating on a twelve (12) second sample cycle.

It is believed that the method of the invention is apparent from the foregoing description of a presently preferred embodiment of the apparatus of the invention. The method, however, comprises the steps of weighing a sample, adjusting the volume of a sample holder according to the weight measurement so that the bulk density of all measured samples is constant, placing the sample in the sample holder, compressing the sample to the preselected bulk density, passing gas through the sample in the sample holder, measuring the gas flow and/or the pressure drop through the sample, and calculating the permeability of the measured sample. The method further comprehends weighing a sample, adjusting the length of a constant cross-sectional area sample holder according to the weight measurement providing a predetermined bulk density when the sample is placed in the closed sample holder, placing the sample in the sample holder, compressing the sample to the predetermined bulk density, passing air through the sample, holding the pressure drop across all measured samples constant, measuring the rate of gas flow through the sample, and calculating the permeability of the measured sample. The method further comprehends calculating the permeability of the measured sample in accordance with the formula $$K = \frac{cQm^{1.5}W}{\Delta P^2 - \lambda Qm}$$

wherein K is the permeability, $Qm$ the gas flow measured through the sample, W is the weight of the sample, $\Delta P^2$ is the pressure drop across the sample holder and $\lambda$ is a constant of the pressure measuring apparatus, and $c$ is a constant depending on the viscosity and density of the gas, the cross-sectional area of the sample, and conversion factors.

The present invention, therefore, is well adapted to carry out the objects and attain the ends and advantages mentioned as well as others inherent therein. While presently preferred embodiments of the invention are given for the purpose of disclosure, numerous changes in the details of construction, arrangement of parts and steps of the process may be made which will readily suggest themselves to those skilled in the art and which are encompassed within the spirit of the invention and the scope of the appended claims.

What is claimed is:

1. A method of measuring fiber permeability of a sample comprising, weighing the sample, adjusting the volume of a sample holder according to the weight measurement so that the bulk density of all measured samples is constant, placing the sample in the sample holder, compressing the sample to the adjusted volume of the sample holder, passing gas lengthwise through the entire sample in the sample holder, instrumentally measuring the pressure drop across the sample, instrumentally measuring the gas flow through the sample, thereby determining the permeability of the sample from the weight, pressure and flow values.

2. The invention of claim 1 including correlating the permeability readings with Micronaire readings.

3. A method of measuring fiber permeability of samples comprising weighing a sample, adjusting the volume of a test chamber according to the weight measurement of the sample to provide that the bulk density of all measured samples is constant, placing the sample in the test chamber, compressing the sample in the test chamber to the adjusted volume of the test chamber, passing gas lengthwise through the entire sample, holding the pressure drop across all tested samples constant whereby the rate of gas flow through the sample and the weight is an indication of the permeability of the sample.

4. A method of measuring fiber permeability of a sample comprising, weighing the sample, adjusting the volume of a sample holder according to the weight measurement to provide a predetermined bulk density when the sample is placed in the closed sample holder, compressing the sample in the sample holder to the adjusted volume of the sample holder, passing gas lengthwise through the entire sample, holding the rate of gas flow through the sample constant, instrumentally measuring the pressure drop across the sample thereby determining the permeability of the measured sample from the weight and pressure values.

5. A method of measuring fiber permeability of a sample comprising, weighing the sample, adjusting the volume of a sample holder according to the weight measurement to provide a predetermined bulk density when the sample is compressed in the sample holder, compressing the sample in the adjusted sample holder to the predetermined bulk density, passing gas lengthwise through the sample in the entire sample holder, establishing the gas pressure drop across the sample as a function of the rate of gas flow through the sample, instrumentally measuring one of said air measurements thereby determining the permeability of the tested sample.

6. An apparatus for measuring fiber permeability of a sample comprising, a scale for weighing the sample, an enclosed passageway adjacent the scale, a test chamber connected to the passageway, an adjustable closure member mounted for movement into and out of the test chamber whereby the test chamber is opened and closed, adjusting means connected to the closure member adjusting the limit of travel of the closure member into the test chamber in response to the measured weight of the sample to provide that all samples when compressed have a constant bulk density, suction means mounted for movement to a position adjacent the test chamber to move the sample from the scale through the passageway and into the test chamber, a supply line adapted to supply gas to the test chamber, a gas flow gauge in the supply line, and an exhaust port through the closure member whereby gas may be passed through the entire compressed sample.

7. An apparatus for measuring fiber permeability of a sample comprising, a scale for weighing the sample, a test chamber adapted to hold various sized samples, an enclosed pasageway connected between the scale and the test chamber, an adjustable closure member mounted for movement into and out of the test chamber whereby the test chamber is opened and closed, adjusting means including servo means connected to the scale and the closure member adjusting the limit of travel of the closure member into the test chamber in response to the measured weight of the sample and providing for the samples to be compressed to a predetermined bulk density when the test chamber is closed, an electrical computer, electrical transmitting means transmitting the weight measurement to the electrical computer, a movable plate positioned adjacent the test chamber, a suction line mounted on said movable plate whereby the sample is pulled from the scale through the passageway into the test chamber when said suction line is positioned adjacent the test chamber, a gas supply line mounted on said movable plate and adapted to supply gas to the test chamber when the supply line is moved adjacent the test chamber, pressure means moving the adjustable closure member into the test chamber and compressing the sample, an exhaust port through the closure member, a gas flow gauge in the supply line measuring the amount of gas flowing through the sample while the test chamber is closed, and electrical means connected to and transmitting the flow measurement to the electrical computer whereby the permeability of the sample is calculated.

8. The invention of claim 7 wherein the computer solves the equation $$K = \frac{cQm^{1.5}W}{\Delta P^2 - \lambda Qm}$$

wherein K is the permeability, $Qm$ the gas flow measured through the sample, W is the weight of the sample, $\Delta P$ is the pressure drop across the sample and $\lambda$ is a constant of the pressure measuring apparatus, and $c$ is a constant depending on the viscosity and density of the gas, the cross-sectional area of the sample, and conversion factors.

9. The invention of claim 7 including an exhaust chamber mounted on said movable plate and a gas jet port connected to the test chamber whereby the sample is ejected from the test chamber when the exhaust chamber is positioned adjacent the test chamber and the jet port is actuated.

10. The improvement in an apparatus for measuring fiber permeability of a sample comprising a scale for weighing the sample, a test chamber adapted to hold various sized samples, an enclosed passageway connected between the scale and the test chamber, an adjustable closure member mounted for movement into and out of a first end of the test chamber whereby the test chamber is opened and closed, adjusting means connected to the scale and the closure member adjusting the limit of travel of the closure member into the test chamber in response to the measured weight of the sample whereby the sample is compressed to a predetermined bulk density when the test chamber is closed, a movable plate positioned adjacent the second end of the test chamber, a suction line mounted on said movable plate whereby the sample is pulled from the scale through the passageway into the test chamber when said suction line is positioned adjacent the test chamber, a gas supply line mounted on said movable plate and adapted to supply gas to the second end of the test chamber when the supply line is moved adjacent the test chamber, means moving the adjustable closure member into the test chamber and compressing the sample, an exhaust port through the closure member, a gas flow gauge in the supply line measuring the amount of gas flowing through the sample when the supply line is positioned adjacent the test chamber and the test chamber is closed.

11. An apparatus for measuring fiber permeability of a sample comprising, a scale for weighing the sample, a test chamber adapted to hold various sized samples, an enclosed passageway connected between the scale and the test chamber, an adjustable closure member mounted for movement into and out of the first end of the test chamber whereby the test chamber is opened and closed, adjusting means including servo means connected to the scale and the closure member adjusting the limit of travel of the closure member into the test chamber in response to the measured weight of the sample thereby providing for all measured samples to be compressed to a predetermined bulk density when the test chamber is closed, a movable plate positioned adjacent the second end of the test chamber, a suction line mounted on the movable plate whereby the sample is pulled from the scale to the passageway into the test chamber when said suction line is positioned adjacent the test chamber, a gas supply line mounted on said movable plate and adapted to supply gas to the test chamber when the supply line is moved adjacent the test chamber, pressure means moving the adjustable closure member into the test chamber and compressing the sample, an exhaust passageway means spaced from the supply line, and a gas flow gauge in the supply line measuring the amount of gas flowing through the sample when the sample is compressed.

References Cited in the file of this patent

UNITED STATES PATENTS

| | | |
|---|---|---|
| 2,860,867 | Allen et al. | Nov. 18, 1958 |
| 2,880,609 | Byrkett et al. | Apr. 7, 1959 |
| 2,888,823 | Hertel | June 2, 1959 |